Aug. 22, 1933.    A. Z. RASH ET AL    1,923,115
HYDRAULIC BRAKE
Filed April 14, 1932    3 Sheets-Sheet 1

Aug. 22, 1933.    A. Z. RASH ET AL    1,923,115
HYDRAULIC BRAKE
Filed April 14, 1932    3 Sheets-Sheet 2

Inventors
A. Z. Rash
Will Rogers
By Hazard and Miller
Attorneys.

Aug. 22, 1933.  A. Z. RASH ET AL  1,923,115
HYDRAULIC BRAKE
Filed April 14, 1932  3 Sheets-Sheet 3

Inventors.
A. Z. Rash.
Will Rogers.
By Hazard and Miller
Attorneys.

Patented Aug. 22, 1933

1,923,115

UNITED STATES PATENT OFFICE 1,923,115

HYDRAULIC BRAKE

Albert Z. Rash and Will Rogers, Santa Monica, Calif., assignors of one-third to Montieth Snedegar, Norwalk, Calif.

Application April 14, 1932. Serial No. 605,200

17 Claims. (Cl. 188—91)

Our invention relates to a hydraulic brake particularly adapted for vehicles and of a type in which reciprocating pistons or plungers operating in cylinders pump a hydraulic fluid, and the resistance to the flow of such fluid creates a brake action due to the resistance to the operation of the plungers or pistons.

In the above type of hydraulic brake, an object and feature of our invention is providing a stationary hub or core-like structure with a plurality of radial cylinders, each having a piston mounted therein for reciprocation and each having a plunger connected to the piston. Hydraulic fluid is forced to the cylinders, preferably on actuating a brake lever, such as depressing a brake pedal. The ends of the plungers project radially from the hub or core structure and engage a cam having a series of waves, that is, raised and depressed portions, extending peripherally on a rotating wheel or other rotating structure, which it is desired to stop in the braking action. With these features of our invention we provide passages for the flow of a hydraulic fluid pumped by the reciprocating pistons, these pistons being reciprocated through the action of the rotating wave-like cam operating on the plungers. The passages in each cylinder are provided with check valves allowing the flow of the hydraulic fluid only in one direction.

Another object and feature of our invention relates to the construction and mounting of a valve with connection to the hydraulic fluid passages, so that a graduation of the flow may be obtained, the valve being designed to increase and decrease the resistance to the flow of the hydraulic fluid. In our invention the valve is connected to the brake applying mechanism, such as the foot pedal of a vehicle, whereby on operating such pedal to apply the brakes, a resistance is placed in the flow of the hydraulic fluid. This, therefore, reacts on the fluid in the cylinders and causes such fluid to resist the movement of the pistons due to the reaction of the plungers with the wave-like rotating cam. Hence, as the pistons and plungers exert a resisting action to the reciprocation they create a resistance to the rotation of the cam, and when the valve is closed sufficiently and the resistance to the flow of the hydraulic fluid is of a sufficient amount, the fluid in the cylinders resists the reciprocating motion of the pistons and their plungers and, hence, the plungers bring their rotating cam and the wheel or the like to which it is connected to a stop, this being a brake applying action.

Our invention is illustrated in the accompanying drawings, in which:

Fig. 4 is a partial section on the line 4—4 of Fig. 1 in the direction of the arrows.

Fig. 5 is a detailed section on the line 5—5 of Fig. 1 through the check valves.

Figure 1:
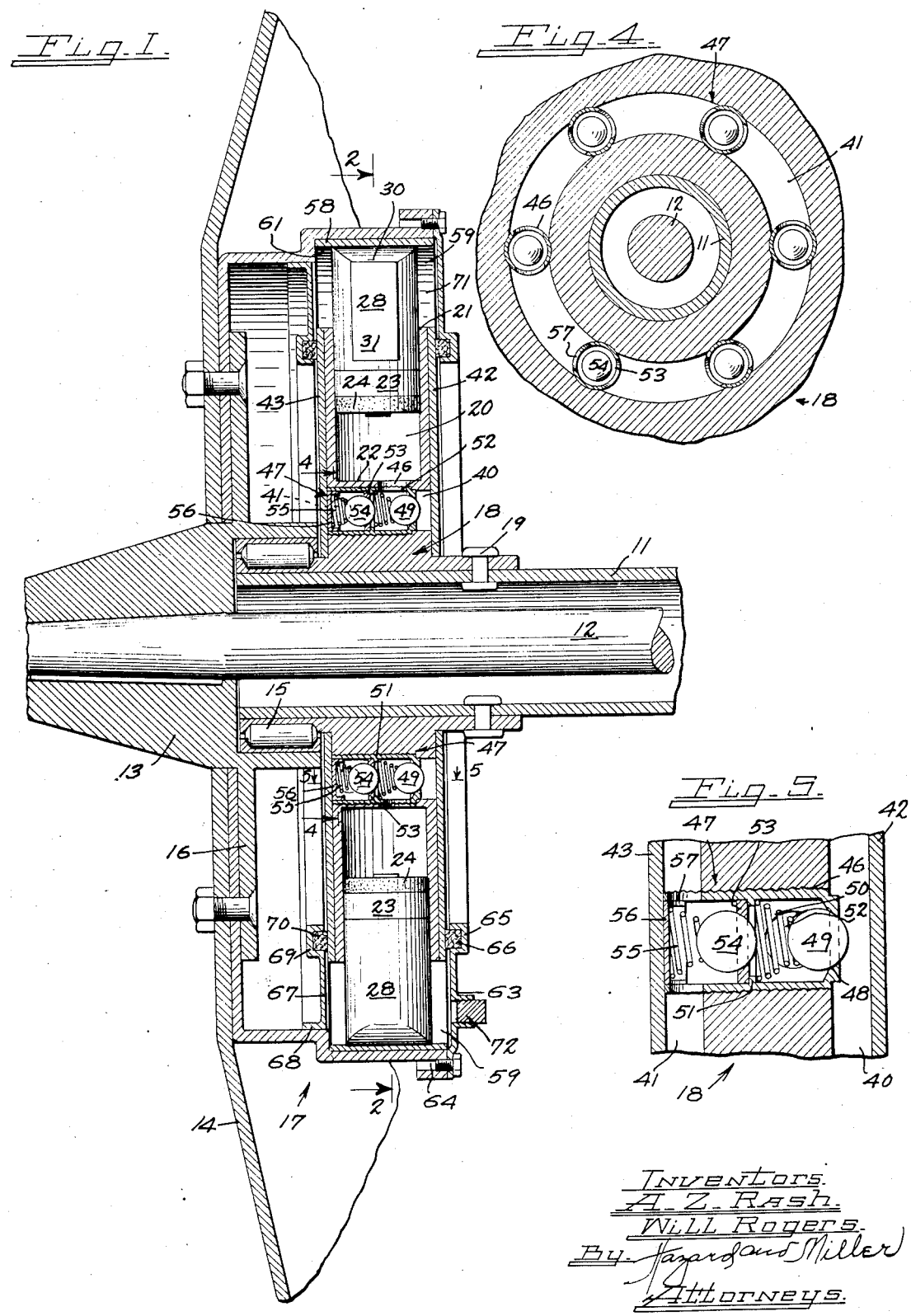
Fig. 1 is a section on the line 1—1 of Fig. 2 in the direction of the arrows.

In the drawings we illustrate an axle housing 11 through which extends the live axle 12 or the driving axle of the vehicle. This is secured to the hub 13 on a wheel 14, there being antifriction bearings 15. The wheel hub is provided with a flange 16 to which is secured the brake drum 17.

In our invention we employ a stationary hub or core 18. This is rigidly secured to the axle housing 11, the attaching means being illustrated as the rivets 19. This may be designated as a cylinder block having the cylinders 20 extending radially inwardly from the circular periphery 21. These cylinders terminate at a base 22. In each cylinder there is a piston 23, such piston being illustrated as having a leather cup 24 secured in place by a washer 25 and a nut 26. The piston has a cup or depression 27 on its outside face, and bearing against this cup and sliding in the cylinder there is a plunger 28 having a domed inner end 29 and a convex curved shoe end 30. The convex curved shoe end extends transversely of the brake drum and to prevent rotation of the plunger, such plunger is flattened on one side 31, this flattened side being engaged by a plate 32 as set in a recess 33 in a stationary hub, the attaching means being a screw 37. Secured to the periphery of the stationary hub there is a flat spring 38 for each plunger secured at 39, which is adapted to retain the plunger and piston in its innermost position for the purpose hereinunder detailed.

There are two annular grooves extending around the hub, one of which may be termed a supply groove 40 and the other a pressure groove 41. Side cover plates 42 and 43 are secured on each side face of the stationary hub and through the inner plate 42 there is a nipple 44 to which is connected a hydraulic fluid supply pipe 45. Adjacent the base 22 of each cylinder there is a valve perforation 46 connecting the grooves 40 and 41.

In this perforation there is secured a valve sleeve 47. This has a valve seat 48 adjacent the supply groove 40, and against this seat bears a ball valve 49 pressed on its seat by a spring 50, this spring bearing on a ring 51 secured in the sleeve 47. A supply port 52 extends through the sleeve 47 and communicates through the base 22 of the cylinder. A second valve seat 53 is fitted in the sleeve 47, preferably adjacent the ring 51. Against this bears the closure ball 54 pressed by a spring 55, this spring being seated in a closure plug 56 attached in the end of the sleeve. The sleeve 47 has ports 57 communicating with the pressure groove 41.

Secured inside of the brake drum 17 there is a braking cam 58. This cam is made in a wave form and may be considered as having depressions 59, and raised portions 60, the raised portions being closer to the axle center than the depressed portions. The sections of the cam are connected with easy curves and form what may be termed a wave-shaped cam track 61 against which the shoe ends 30 of the plungers are designed to bear. It will be noted that there is a clearance 62 between the inner projection of the cam and the periphery of the stationary hub. The cam is secured in the brake drum in any suitable manner and may be removed for replacement.

A side ring 63 is secured to the peripheral portion 64 of the brake drum. This has an annular groove 65 for a grease packing ring 66, which ring bears on the plate 42. On the opposite side there is a second ring 67 secured as indicated at 68 to the brake drum and also having a groove 69 with a packing ring 70. The space between the cam and the periphery 21 of the stationary hub and the plates 63 and 67 may be considered as a plunger operating space 71 and this is filled reasonably full of free flowing grease, which grease may be inserted through grease fittings 72.

In the stationary hub 18 there is a transverse opening with a control valve 73 mounted therein in which is fitted a rotatable valve plug 74. This plug has an operating stem 75 extending through an opening in the plate 42. This valve has supply and pressure ports 76 and 77 which register with supply passages 78 and pressure passages 79 connecting respectively to the supply groove 40 and pressure groove 41. The stem 75 has an operating arm or lever 80.

Figure 6:
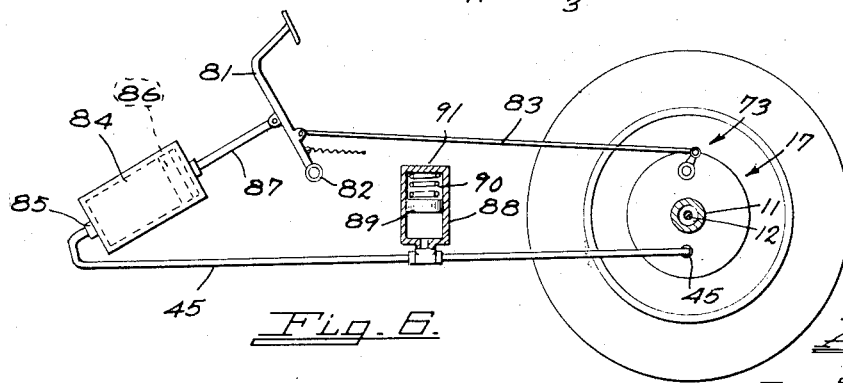
Fig. 6 is a diagram of the brake applying and controlling mechanism.
Figure 3:
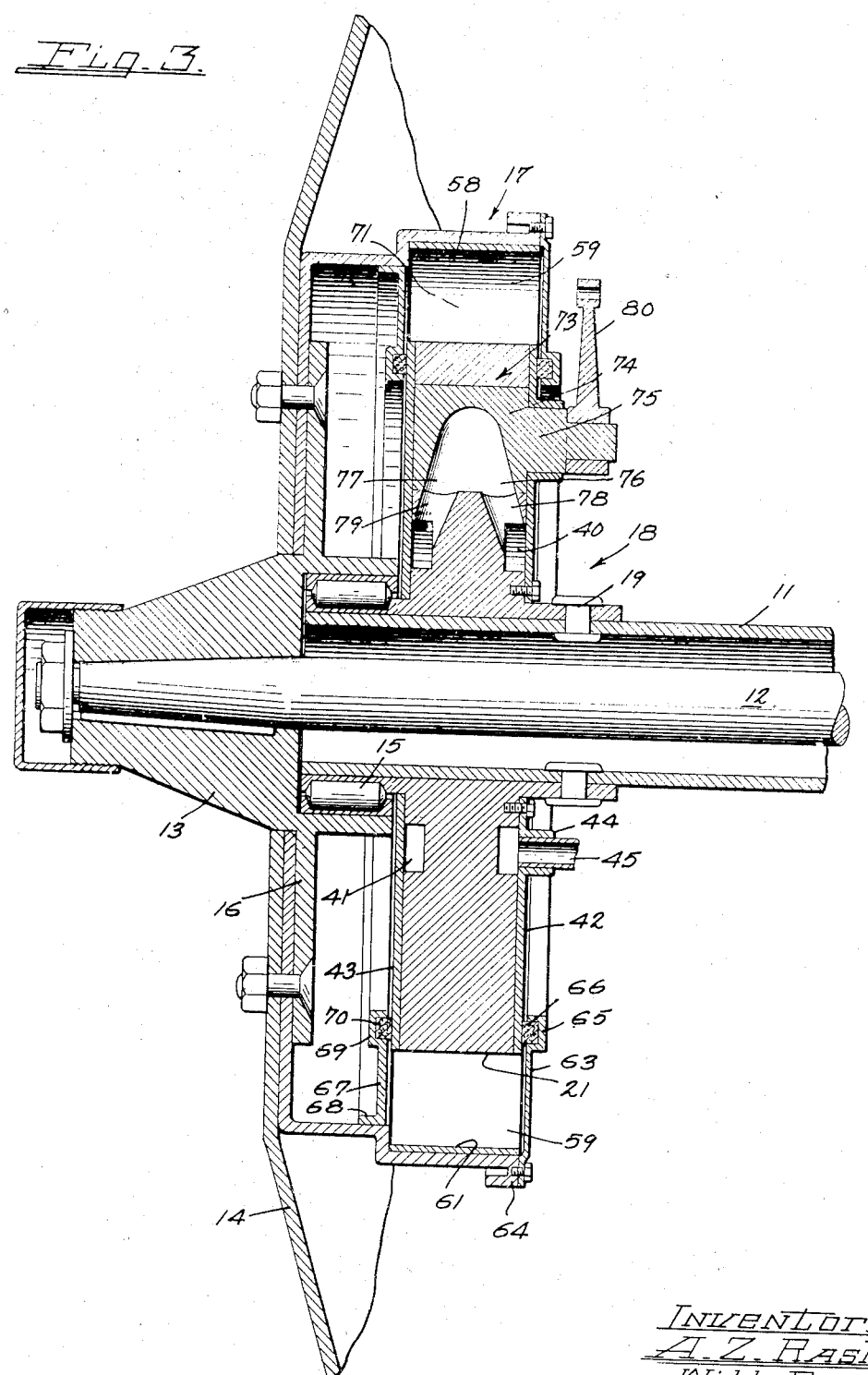
Fig. 3 is a section on the line 3—3 of Fig. 2 in the direction of the arrows.

In Fig. 6 we show a connection of our brake construction with a brake pedal of a vehicle. In this connection the brake pedal is indicated at 81, being pivoted at 82. This has a brake rod 83 which connects to the arm 80. A hydraulic pressure cylinder 84 has its outlet end 85 connected to the supply pipe 45. A piston 86 operating in this cylinder is connected by a piston rod 87 to the brake pedal 81. Therefore, as the brake pedal is depressed, hydraulic fluid is forced from the cylinder 84 through the pipe 45 into the annular supply groove 40.

On the initial depressing of the foot pedal the hydraulic fluid, preferably oil, in the cylinder 84 is forced through pipe 45 into the annular supply groove 40. The pressure is sufficient for this to overcome the resistance of the springs 50 and force the balls 49 inwardly so that the cylinders may be filled. Then, the pistons may be forced outwardly and carry their plungers 28 until the plungers come into contact with the cam track 61. The pistons and plungers have normally been retained in their innermost position after being forced in by the cams by the springs 48. The wave-like cams on the rotating brake drum then force the plungers and pistons inwardly and when forced inwardly the oil must be expelled through the ports 52 in the base of each cylinder. The pressure in each cylinder causes a tight seating of the ball valve 49 so that this fluid cannot be pumped back into the supply groove 40 but it opens the second ball valve on the pressure side by depressing the ball and allowing the fluid to flow through the ports 57 in the valve sleeve 47 into the pressure groove 41. If the valve 73 is partly open the fluid from this pressure groove is transferred through the valve to the supply groove 40. The pressure in the supply side when the pedal is slightly depressed is always sufficient to force the oil past the ball valves 49 into the cylinders and thus the cylinders with their plungers are forced outwardly and follow the contour of the wave-like cam, that is, the cam forcibly presses the plungers and pistons inwardly when the shoes 30 ride on the cam from a depressed section 59 to an elevated section 60, that is, the action of the cam forces the plungers and pistons inwardly. As the cam rotates, the hydraulic pressure in the cylinders forces the pistons and plungers outwardly while the cam moves from an elevated section 60 to a depressed section 59 engaging each of the plungers in succession. That is, the hydraulic pressures causes the plungers to follow up the surface of the cam.

As the foot pedal is further depressed, the valve 73 is closed to a greater degree and causes a much greater resistance to the transfer of the hydraulic fluid from the pressure groove 41 to the supply groove 40 and, manifestly, this increases the power required to push the plungers and their pistons inwardly, which power is derived from the rotating brake drum and cam on the portion of the stroke of each cylinder, in which the cam forcibly thrusts the plunger and its piston in radially. This resistance to the radial movement inwardly of the plunger gives a resistance to the rotational movement of the brake drum, hence, the wheel. By depressing the foot pedal to the desired extent the valve 73 may be closed off a sufficient amount to bring the brake drum to rest, this giving a braking action on the wheel.

Figure 2:
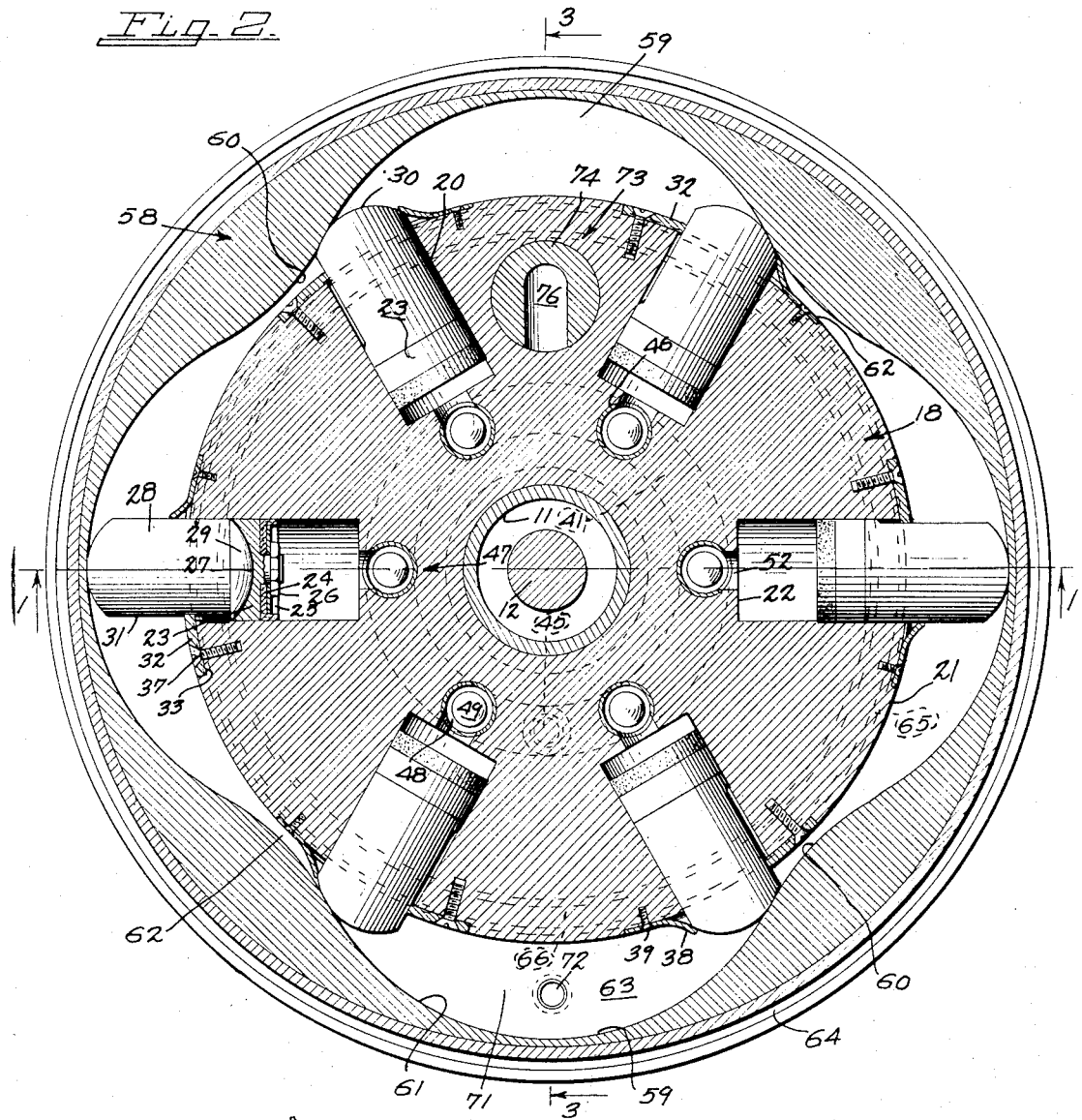
Fig. 2 is a section on the line 2—2 of Fig. 1 in the direction of the arrows.

In order to release the brakes it is only necessary to allow the brake pedal to raise, whence the action of the line 83 opens the valve 73. The suction created by the retraction of the piston 86 causes a removal of a certain amount of the hydraulic fluid from the annular supply groove 40 and the pressure groove 41. This allows all of the pistons to be forced inwardly by their plungers engaging the high spots of the rotating cam, thrusting the plungers and the pistons inwardly until the springs 83 engage the end of a plunger moved inwardly to its full extent. These plungers are, therefore, held inwardly. Manifestly, where six cylinders are used, as illustrated herein, and are located in the position of Fig. 2 in the stationary hub, the two upper pistons will drop down due to the action of gravity. The two horizontal pistons are forced inwardly by the cams and will, possibly, remain in their innermost position unless shaken out by vibration of the vehicle, but the two lower pistons would tend to drop and the plungers would be continuously contacting with the wave cam, but when these plungers are forced inwardly by the high spots of the cam the springs hold them in the elevated position. Thus, the wheel may rotate without engaging the plungers until these are forced inwardly on another application of the brakes.

In order to accommodate the excess fluid over tht required to fill the cylinders in the braking system when the brake is applied, we employ a compression cylinder 88 which is connected in the supply line pipe 45. This cylinder has a piston 89 therein and a compression spring 90 which bears against the piston and the head 91 of the cylinder. Therefore, when the foot pedal is depressed and the cylinders in the stationary hub are filled to their capacity the excess fluid forces the piston 89 outwardly against the compression of the spring 90. This gives a substantially constant pressure on the supply side, that is, in the supply duct 40, and the pressure is built up in the pressure side by the pumping action of the pistons when the valve 74 is closed in the action of depressing the brake pedal.

Various changes may be made in the details of construction without departing from the spirit or scope of the invention as defined by the appended claims.

We claim:

1. A brake having a stationary hub with a plurality of cylinders therein each having a piston with a plunger thereon, a fluid groove in each side of the hub and communicating with each cylinder, a rotatable brake drum having a wave-like cam therein to engage the plungers, and means to control the flow of hydraulic fluid to and from the grooves and the cylinders to cause the plungers and pistons to exert a resistance to the rotation of the brake drum.

2. A brake having a stationary hub with a plurality of radial cylinders therein each having a piston with a plunger, said hub having an annular groove on opposite sides, a valve connection between each groove communicating with each cylinder, means to supply a hydraulic fluid to one of the grooves, a communicating valve between the grooves independent of the cylinders, with means to control said valve, and a brake drum having a wave-like cam to engage said plungers and reciprocate the pistons.

3. A brake having a stationary hub with a plurality of radial cylinders each having a piston with a plunger, a port in the base of each cylinder, the hub having an annular groove on opposite sides communicating with the ports of the cylinders, a connecting passage between each of the grooves connecting with the cylinder ports and having control valves therein, means to supply hydraulic fluid under pressure to one of the grooves, a control valve regulating the flow of fluid from one groove to another independent of the cylinders, and a brake drum having a wave-like cam to engage the plungers and reciprocate the pistons, the reciprocation of the pistons pumping the fluid from one groove to another.

4. A brake having a stationary hub with a plurality of radial pistons therein each having a plunger to project beyond the hub, the hub having an annular groove on each side, one for supply fluid and the other for pressure fluid, a communicating passage between each groove adjacent the base of each cylinder with a port connecting to each cylinder, a check valve between the supply groove and the cylinder port, and a second check valve between the cylinder port and the pressure groove, a control valve connecting said grooves independent of the cylinders and the check valves, and a rotatable brake drum having a wave-like cam, the cam engaging the ends of the plungers and reciprocating the pistons to pump fluid from the supply groove to the pressure groove, said valve regulating the return flow of such fluid.

5. A brake as claimed in claim 4, means to supply fluid under pressure to the supply groove, and means operating simultaneously therewith to operate the control valve.

6. A brake having a stationary hub with a plurality of radial cylinders each with a piston and a plunger, the hub having an annular groove for supply fluid on one side and a second annular groove for pressure fluid on the opposite side with a connecting passage between the grooves adjacent the base of each cylinder, each base having a port communicating to said passage, a valve sleeve in each passage having a first check valve connecting between the cylinder ports and the supply groove, a second check valve connecting between the cylinder ports and the pressure groove to permit intake of fluid to the cylinders from the supply groove and the pumping of said fluid from the cylinders to the pressure groove, a control valve for transference of fluid from the pressure to the supply groove, means to supply fluid under pressure to the supply groove, means to operate the control valve, and a rotatable brake drum having internal wave-like cam to engage the ends of the plungers and to reciprocate said plungers and pistons.

7. A brake as claimed in claim 6, an interacting means between the plungers and the hub to prevent rotation of said plungers, and said plungers having outer ends provided with shoe ends curved convexly considered in a peripheral direction to ride on said wave-like cams.

8. A brake as claimed in claim 6, a spring means interacting between the stationary hub and each of the plungers to retain such plunger and piston in its innermost position when the brake is not in use.

9. A brake having an axle with a fixed hub connected thereto, said hub having a plurality of radial cylinders spaced equidistant around its periphery, the hub having a first annular passage for supply fluid on one side and a second annular passage on the opposite side for pressure fluid, connecting passages through the hub from the supply to the pressure passages adjacent the base of each cylinder, with a port from each interconnecting passage to the base of the adjacent cylinder, a first check valve in the connecting passage between said port and the supply fluid passage, and a second check valve between said port and the pressure fluid passage, means to supply hydraulic fluid to the supply passage, a control valve mounted in the hub and connecting the two passages for transference of fluid from the pressure to the supply passage, a rotating brake drum having a wave-like cam, said cam having portions at different radii from the center of rotation, a piston in each cylinder having a plunger, the end of the plungers operating on said wave-like cam whereby in the reciprocating action of the pistons the hydraulic fluid is pumped from the supply passage to the cylinders and from the cylinders to the pressure passage and by means of the valve from the pressure to the supply passage, means to operate the control valve to gradually change the resistance to flow of the hydraulic fluid from the pressure to the supply passage and thereby increase the resistance to the operation of the plungers and pistons in their cylinders and thereby create a braking action on the brake drum.

10. A brake as claimed in claim 9, a brake applying device interconnected to supply the hydraulic fluid to the supply passage and to simultaneously operate the control valve.

11. A brake as claimed in claim 9, a brake applying device interconnected to supply the hydraulic fluid to the supply passage and to simultaneously operate the control valve, and an expansion chamber connected to the supply passage to accommodate excess hydraulic fluid over that necessary to fill the cylinders.

12. A brake as claimed in claim 9, said pistons and plungers being separate, the plungers bearing on the pistons, interconnecting means between the hub and the plungers to restrain said plungers from rotation on their radial axes, each plunger having a shoe end convexly curved considered peripherally and shaped parallel to the axis of rotation of the cam to engage the surface of the rotating cam.

13. A brake as claimed in claim 9, said pistons and plungers being separate, the plungers bearing on the pistons, interconnecting means between the hub and the plungers to restrain said plungers from rotation on their radial axes, each plunger having a shoe end convexly curved considered peripherally and shaped parallel to the axis of rotation of the cam to engage the surface of the rotating cam, and a spring mounted on the stationary hub adjacent each plunger to engage and retain such plunger in its innermost position when the brake is held inoperative.

14. A brake comprising, in combination, an axle having a stationary hub, a plurality of radial cylinders, a supply and pressure fluid groove on opposite sides of the hub with connecting passages adjacent the base of each cylinder, a port from each passage to each cylinder, check valves between said port and the supply and pressure grooves, a piston in each cylinder having a plunger, a valve in the hub having a connection to each groove, a rotatable brake drum having a wave-like cam to engage the plungers, a brake operating lever, a hydraulic cylinder with a piston operated by said lever, a fluid connection from the cylinder to the supply groove having an expansion chamber connected therein, a connection from said lever to said control valve whereby on operation of the brake lever hydraulic fluid is supplied to the supply groove and hence to the cylinders, and the control valve is operated to control the flow of fluid from the pressure to the supply groove.

15. A brake as claimed in claim 14, the expansion chamber having means to create a substantially constant pressure on the fluid of the supply groove.

16. A brake having a stationary hub with radial cylinders therein, a supply groove on one side, a pressure groove on the other, with connecting passages and ports from each passage to a cylinder, a piston slidable in each cylinder, a free moving plunger bearing on each piston in each cylinder, a control valve between said grooves, means to supply hydraulic fluid to the supply groove, check valves in said passages between the grooves and the port whereby the pistons operate to pump the fluid from the supply to the pressure groove, a rotating brake drum having a wave-like cam, means to engage each plunger to restrain rotation of such plunger on its radial axis, each plunger having a shoe end to engage said cam.

17. A brake as claimed in claim 16, said restraining means comprising a flat surface on each plunger, and a restraining plate to engage such flat surface.

ALBERT Z. RASH.
WILL ROGERS.